US012752658B2

(12) United States Patent
Fietzek et al.

(10) Patent No.: US 12,752,658 B2
(45) Date of Patent: Oct. 6, 2026

(54) SYSTEMS AND METHODS FOR CHARGING MANAGEMENT OF ELECTRIC VEHICLES

(71) Applicant: InCharge Energy, Inc., Santa Monica, CA (US)

(72) Inventors: Cliff Fietzek, Arlington, VA (US); Russell Schmidt, Los Angeles, CA (US)

(73) Assignee: InCharge Energy, Inc., Los Angeles, CA (US)

( * ) Notice: Subject to any disclaimer, the term of this patent is extended or adjusted under 35 U.S.C. 154(b) by 707 days.

(21) Appl. No.: 18/335,744

(22) Filed: Jun. 15, 2023

(65) Prior Publication Data

US 2024/0416783 A1 Dec. 19, 2024

(51) Int. Cl.

| | |
|---|---|
| ***B60L 53/62*** | (2019.01) |
| ***B60L 53/66*** | (2019.01) |
| ***H02J 7/82*** | (2026.01) |

(52) U.S. Cl.
CPC ............... *B60L 53/62* (2019.02); *B60L 53/66* (2019.02); *H02J 7/82* (2026.01)

(58) Field of Classification Search
CPC ....................................................... B60L 53/62
USPC .......................................................... 320/109
See application file for complete search history.

(56) References Cited

U.S. PATENT DOCUMENTS 9,136,727 B2 * 9/2015 Takano ............... H01M 10/443
2013/0200845 A1 * 8/2013 Bito ........................ H02J 7/977 320/109
2018/0205417 A1 * 7/2018 Raj .......................... H04B 5/79
2019/0305564 A1 * 10/2019 Yebka ..................... H02J 7/977
2021/0281093 A1 * 9/2021 Elidrissi .................. H02J 7/825

FOREIGN PATENT DOCUMENTS

JP 2015512607 A 4/2015
JP 2017079577 A 4/2017
JP 2019006251 A 1/2019

OTHER PUBLICATIONS

Dylan Crosbie, "How To Precondition Your EV Battery (For fast charging)," Climatebiz, published May 24, 2022, Retrieved from the Internet <https://climatebiz.com/how-to-precondition-your-ev-battery/>.

(Continued)

*Primary Examiner* — Ahmed H Omar
(74) *Attorney, Agent, or Firm* — Select IP Law Corporation; Ashkon Cyrus

(57) ABSTRACT

A charging management computing device for managing charging of an electric vehicle at a charging point is provided. The charging management computing device includes at least one processor in communication with at least one memory device. The at least one processor is programmed to instruct a charging point to charge an electric vehicle at a first charging power until a state of charge (SOC) of the electric vehicle reaches a threshold SOC, the threshold SOC being less than 100%. The at least one processor is also programmed to reduce a charging power delivered to the electric vehicle from the first charging power to a second charging power, monitor the SOC of the electric vehicle, and maintain the SOC to be below 100% until a time point before a departure time of the electric vehicle from the charging point by adjusting the charging power based on the SOC.

17 Claims, 5 Drawing Sheets

(56) References Cited

OTHER PUBLICATIONS

"What is EV battery and cabin preconditioning?" blog post on Electric Together, Retrieved on May 9, 2023 from the Internet <https://electrictogether.com/get-help/what-is-battery-and-cabin-preconditioning#:~:text=Each%20EV%20has%20a%20battery,2%2D3%20hours%20to%20perform>.
International Search Report (ISR) for International Application No. PCT/US2024/032124.
Written Opinion of the International Searching Authority (WO) for International Application No. PCT/US2024/032124.

* cited by examiner

SYSTEMS AND METHODS FOR CHARGING MANAGEMENT OF ELECTRIC VEHICLES

BACKGROUND

The field of the disclosure relates generally to systems and methods of electric vehicles, and more particularly, to systems and methods of charging management of electric vehicles.

Electric vehicles have become popular. With the growing popularity of EVs, known systems and methods are disadvantaged in some aspects in meeting the needs of EVs and improvements are desired.

BRIEF DESCRIPTION

In one aspect, a charging management computing device for managing charging of an electric vehicle at a charging point is provided. The charging management computing device includes at least one processor in communication with at least one memory device. The at least one processor is programmed to instruct a charging point to charge an electric vehicle at a first charging power until a state of charge (SOC) of the electric vehicle reaches a threshold SOC, the threshold SOC being less than 100%. The at least one processor is also programmed to reduce a charging power delivered to the electric vehicle from the first charging power to a second charging power, monitor the SOC of the electric vehicle, and maintain the SOC to be below 100% until a time point before a departure time of the electric vehicle from the charging point by adjusting the charging power based on the SOC.

In another aspect, a method of managing charging of an electric vehicle at a charging point is provided. The method includes instructing a charging point to charge an electric vehicle at a first charging power until an SOC of the electric vehicle reaches a threshold SOC, the threshold SOC being less than 100%. The method also includes reducing a charging power delivered to the electric vehicle from the first charging power to a second charging power, monitoring the SOC of the electric vehicle, and maintaining the SOC to be below 100% until a time point before a departure time of the electric vehicle by adjusting the charging power based on the SOC.

In one more aspect, one or more non-transitory machine-readable storage media for managing charging of an electric vehicle at a charging point is provided. The media include a plurality of instructions stored thereon that, in response to being executed, cause a system to instruct a charging point to charge an electric vehicle at a first charging power until an SOC of the electric vehicle reaches a threshold SOC, the threshold SOC being less than 100%. The plurality of instructions also cause the system to reduce a charging power delivered to the electric vehicle from the first charging power to a second charging power, monitor the SOC of the electric vehicle, and maintain the SOC to be below 100% until a time point before a departure time of the electric vehicle from the charging point by adjusting the charging power based on the SOC.

BRIEF DESCRIPTION OF DRAWINGS

These and other features, aspects, and advantages of the present disclosure will become better understood when the following detailed description is read with reference to the accompanying drawings in which like characters represent like parts throughout the drawings.

DETAILED DESCRIPTION

The disclosure includes systems and methods for charging management of electric vehicles. An electric vehicle is a vehicle that operates on an electric motor, and may be a battery electric vehicle (BEV), a plug-in hybrid electric vehicle (PHEV), or a hybrid electric vehicle (HEV). Method aspects will be in part apparent and in part explicitly discussed in the following description.

Figure 1:
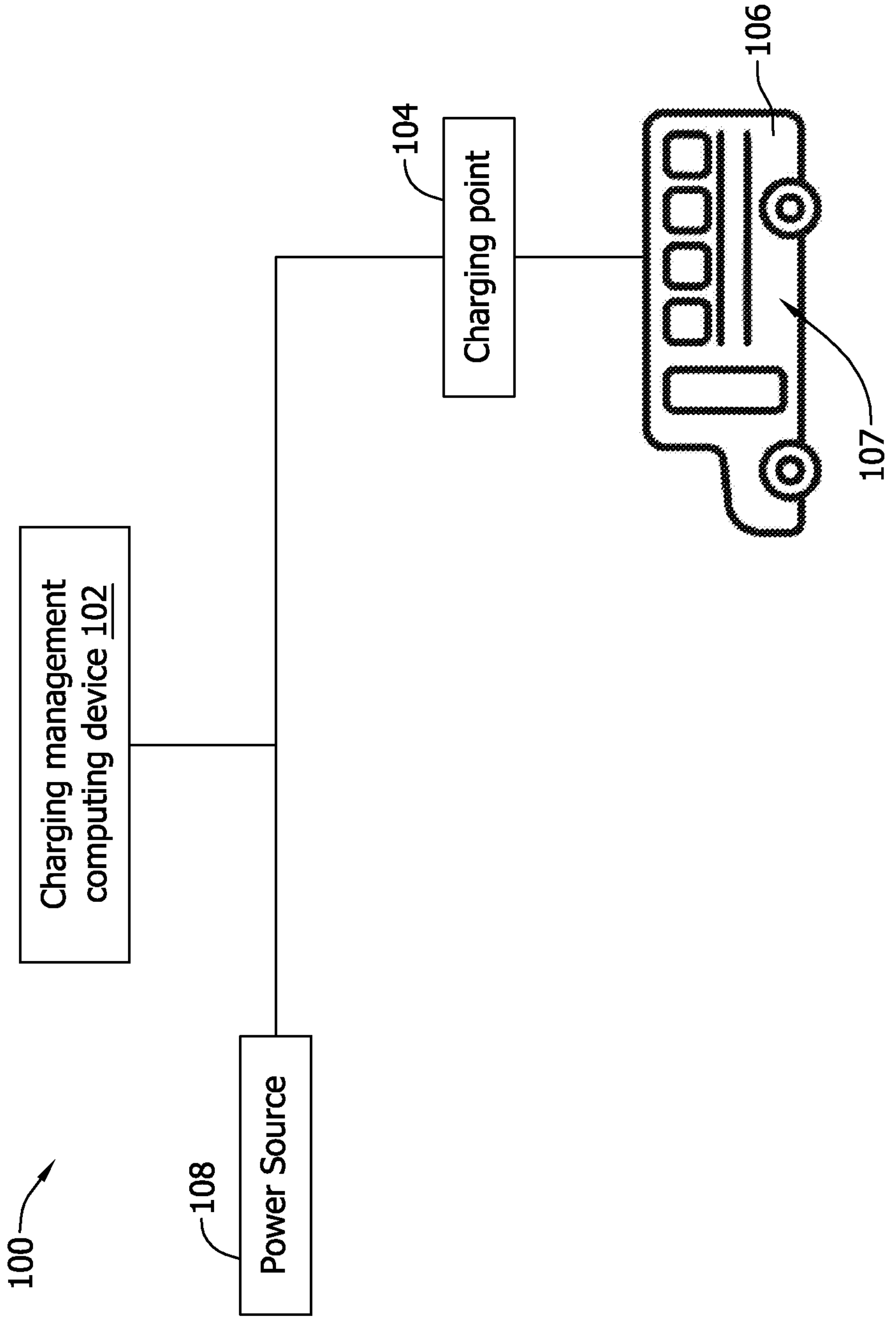
FIG. 1 is a schematic diagram of a charging control system for managing charging of electric vehicles.

FIG. 1 is a schematic diagram of an example charging control system 100. In the example embodiment, charging control system 100 includes a charging management computing device 102. Charging management computing device 102 may be a computing device 800 (see FIG. 4 described later). Charging management computing device 102 may be a server computing device 1001 (see FIG. 5 described later). Charging control system 100 further includes charging points 104 in communication with charging management computing device 102 via wired or wireless communication. Charging point 104 may be a point that an electric vehicle 106 is charged by receiving electric power from a power source 108 such as a power grid. Electric vehicle 106 may be a personal vehicle such as a car or a truck, or a commercial vehicle such as a heavy truck, a bus, or a train. Electric vehicle 106 may be a water vehicle such as a boat, or an aerial vehicle such as an airplane. Charging point 104 may be a charging station, a charging outlet at home, office, or a facility such as a parking lot. A battery 107 of electric vehicle 106 may be recharged at charging point 104. Battery 107 may be referred to as a traction battery, which is used to power the propulsion of electric vehicle 106. Charging management computing device 102 and/or charging point 104 may communicate with electric vehicle 106 via wired or wireless communication.

In known methods, in a charging session, the battery of the electric vehicle is charged to full and the charging session ends. The charging profile is determined by the electric vehicle. The charging point is passive, where the charging point receives charging orders from the electric vehicle and executes the orders. A control loop that manages the charging session by considering the power consumption before the departure of the vehicle from the charging point is not included. Power consumed by a commercial vehicle in startup is relatively large. For example, 20% or more of state of charge (SOC) of the battery may be consumed in startup of the electric vehicle. SOC indicates the level of charge in the battery and is represented as a percentage of the charge remained relative to the charge when the battery is fully charged, which is 100%. In known methods, at a charging point, an electric vehicle is charged to full and the charging session ends. The electric vehicle uses the battery for startup. As a result, by the time when the electric vehicle starts to move, the state of charge of the battery would have reduced to a level, such as 80%, which is far less than being fully charged. Further, electric vehicle 106 is desired to be preconditioned before departure. For example, electric vehicle 106 is desired to be cooled or heated to the temperature suitable for passengers. Battery 107 and/or other systems in the electric vehicle are also desired to be preconditioned before charging or during charging. In some known methods, preconditioning is powered by the battery of the electric vehicle, depleting the battery. In other known methods, preconditioning is manually performed, where preconditioning is manually activated by a user. Such methods are inconvenient and cumbersome, prone to human error, and subject to human forgetfulness. Accordingly, known methods do not meet the needs of EVs.

In contrast, the systems and methods described herein facilitate a charging point to actively manage a charging session. A control loop is included to control the charging session. The systems and methods described herein keep a charging session alive while providing power needed for start-up and/or preconditioning, thereby ensuring the vehicle at or near 100% of SOC at the departure time or the time when the electric vehicle departs the charging point. The systems and methods described herein include a control mechanism, where the charging power is adjusted based on the changes in the SOC and the consumption of power by the electric vehicle, thereby meeting the needs of users by automizing the management of a charging session and increasing convenience and reliability of charging.

Figure 2:
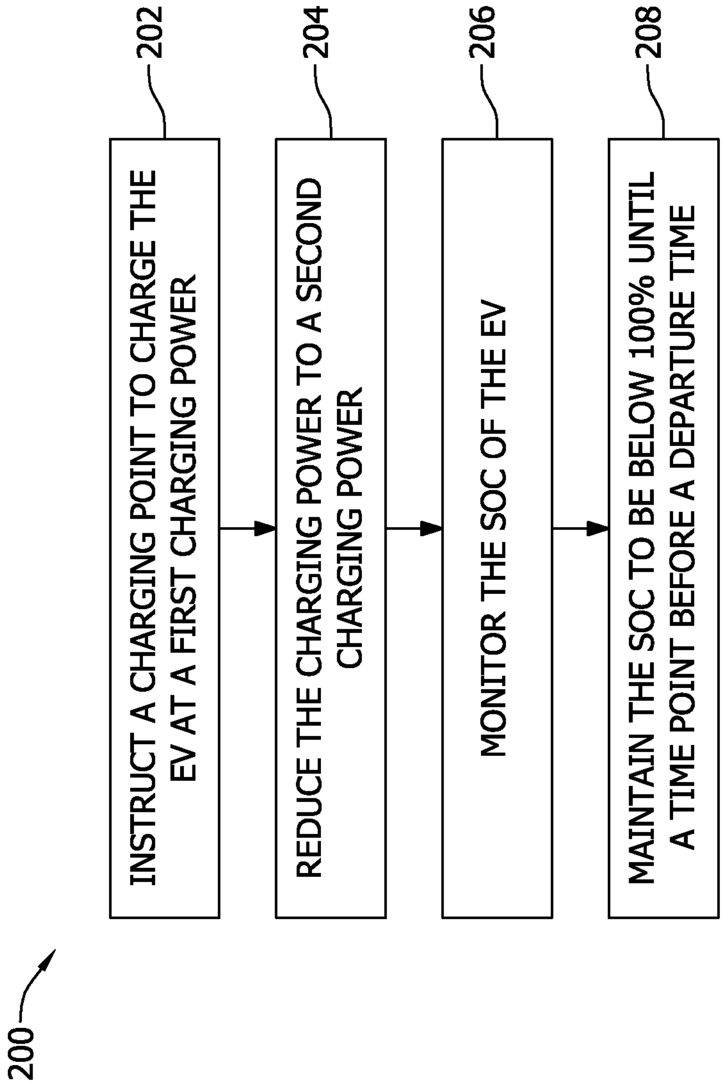
FIG. 2 is an example method of managing charging of electric vehicles.

FIG. 2 is a flow chart of an example method 200 of managing charging of electric vehicles. Method 200 may be implemented on charging management computing device 102. In the example embodiment, method 200 includes receiving a charging request from an electric vehicle at a charging point. When an electric vehicle 106 is plugged in a charging point 104, electric vehicle 106 sends a charging request. The charging request is relayed to charging management computing device 102. Method 200 further includes instructing 202 the charging point to charge the electric vehicle at a first charging power until an SOC of the electric vehicle reaches a threshold SOC. The first charging power may be the maximum charging power allowed by electric vehicle 106 or provided by charging point 104. An example first charging power is 60 kW. The threshold SOC is less than 100%. A charging session ends when the SOC of the electric vehicle is 100%.

In known methods, in a charging session, an electric vehicle is charged to 100%, and the charging session ends. The electric vehicle electrically disconnects itself from the charging point. When the electric vehicle starts up, power from the battery is used in the start-up, draining the battery. As a result, an electric vehicle, especially a commercial electric vehicle, is not fully charged when the electric vehicle departs the charging point, reducing the range of the electric vehicle. Further, because the charging session has ended, if the user wants to fill the battery, charging has to be manually reinitiated, causing inconvenience for the users.

In contrast, in method 200, charging point 104 is instructed to charge the electric vehicle to a threshold SOC that is less than 100%. The charging session remains alive, and electric vehicle 106 remains electrically coupled with charging point 104 and draws power from charging point 104. Electric vehicle 106 continues to be charged during start-up and/or preconditioning.

In the example embodiment, the threshold SOC is 97%. To protect the battery, an electric vehicle typically reduces the power allowed to be charged to the electric vehicle to an ultra-low level when the SOC reaches 98%. The threshold SOC is chosen as 97%, which is less than 98%, such that the charging power is not reduced to the ultra-low level. Further, the threshold SOC of 97% also provides the electric vehicle 106 with a relatively high SOC if the user decides to end the charging session before the departure time. In some embodiments, the threshold SOC is user defined. Charging management computing device 102 may provide a user interface, where a user may input parameters used in method 200, such as the threshold SOC. The user interface may be on the charging management computing device 102. Alternatively, the user interface may be provided on charging point 104 or an application such as a mobile app or a web application that is accessible to the user.

In the example embodiment, method 200 further includes reducing 204 charging power to a second charging power. The second charging power is less than the first charging power. An example second charging power is 10 kW. Method 200 also includes monitoring 206 the SOC of the electric vehicle at the charging point. In addition, method 200 includes maintaining 208 the SOC to be below 100% until a time point before the departure time of the electric vehicle by adjusting the charging power based on the SOC. The charging session remains alive until the departure time such that battery 107 is not drained or depleted from start-up and/or preconditioning of electric vehicle 106. The SOC may be maintained at a stable level such as a level approximate to the threshold SOC. If the SOC continues to increase for a first period of time such as 4 s, the charging power is reduced. If the SOC continues to decrease for a second period of time such as 4 s, the charging power is increased. The first period of time and the second period time may be the same or different. The first and second periods of time may be user defined. In some embodiments, the first charging power and/or the second charging power are user defined. A user may enter the first charging power and/or the second charging power via an interface provided by charging management computing device 102.

Figure 3:
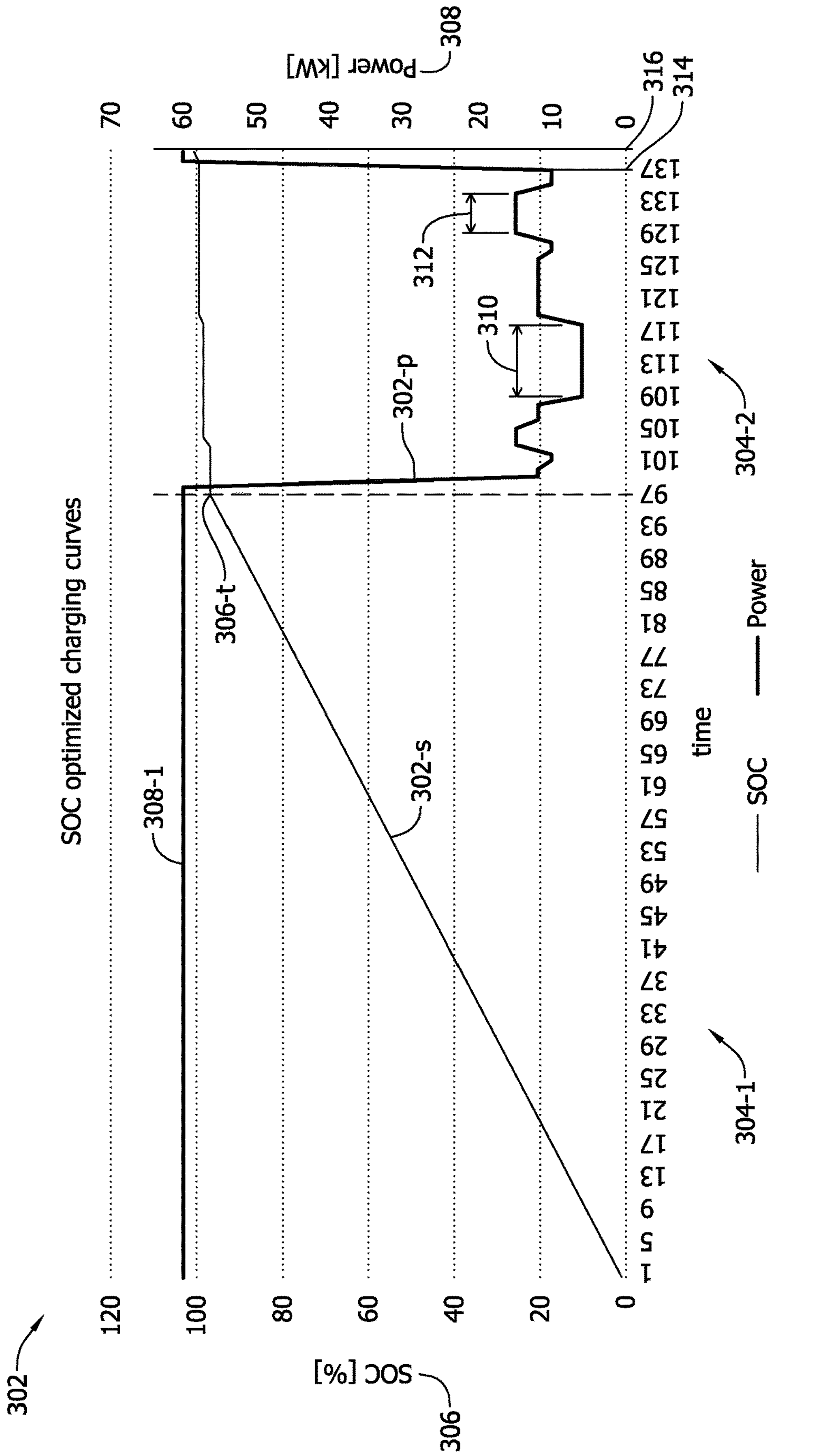
FIG. 3 shows example charging curves.

FIG. 3 shows example charging curves 302. In the example embodiment, charging curves 302 include a curve 302-*p* of the charging power 308 over time. Charging curves 302 also include a curve 302-*s* of SOC 306 over time. The unit for the time is second(s). Charging curves 302 include two sections 304-1 and 304-2. Before SOC 306 reaches a threshold SOC 306-*t*, charging curves 302 are at section 304-1, where charging power 308 is at a first charging power 308-1, e.g., 60 kW. After SOC 306 reaches threshold SOC 306-*t*, charging curves 302 are at section 304-2, where a control loop is activated. Charging power 308 is reduced to second charging power 308-2, e.g., 10 KW, at first and is adjusted based on SOC 306. For example, if SOC 306 continues to increase for a period of time, charging power 308 is reduced. If SOC continues to decrease for a period of time, charging power 308 is increased. The control mechanism is used to maintain SOC 306 at a stable level in section 304-2. The specific shapes of curves 302 are shown as examples for illustration purposes only. Curves 302 may be in other shapes. For example, curve 302-*s* at first section 304-1 may be nonlinear. In some embodiments, preconditioning and/or start-up may occur during first section 304-1, changing charging curves 302.

In the example embodiment, electric vehicle 106 may shut down charging if electric vehicle 106 senses the SOC is decreasing, where electric vehicle 106 may interpret the decrease in SOC while being charged as an indicator of malfunction of electric vehicle 106 or battery 107 and shut down the charging session to protect electric vehicle 106 or battery 107. Electric vehicle 106 may also shut down charging if electric vehicle 106 senses the SOD reaches the full level of 100%. The communication between charging management computing device 102 and charging point 104 is at a frequency higher than the communication frequency between charging point 104 and electric vehicle 106. For example, electric vehicle 106 may send out and receive a communication packet every minute. The communication between charging management computing device 102 and charging point 104 is every 10 s such that a sufficient time is provided to perform the adjustment of the charging power before electric vehicle 106 shuts down the charging session. The frequency of the communication between charging point 104 and charging management computing device 102 may be adjusted. In some embodiments, the frequency is user defined.

In the example embodiment, in section 304-2, SOC 306 is kept relatively stable via the control loop. When electric vehicle 106 does not use power (see period 310), charging power 308 may be reduced to a level less than second charging power 308-2. When electric vehicle 106 uses power to perform functions such as start-up and/or preconditioning (see period 312), charging power 308 may be increased above second charging power 308-2. At a time point 314 that is close to departure time 316, charging power 308 returns back to first charging power 308-1 such that battery 107 is charged to 100%. An example time point 314 is 4 s before departure time 316. Time point 314 may be predefined. Time point 314 may be user defined. As a result, at departure time 316, SOC 306 of battery 107 is at or approximately at 100%.

In the example embodiment, electric vehicle 106 may have a timer set for preconditioning. For example, a few hours before departure time, preconditioning may be started. Method 200 is used to automize the management of the charging session such that SOC 306 of electric vehicle 106 is fully charged and electric vehicle 106 has been preconditioned. Electric vehicle 106 may be plugged in a charging point 104. When SOC reaches threshold SOC 306-*t*, charging power 308 is reduced to second charging power 308-2. Before departure time 316, SOC 306 is kept below 100% such that the charging session is alive. SOC 306 is monitored and charging power 308 is adjusted based on the SOC (see section 304-2). If SOC 306 reduces for a period of time due to preconditioning, charging power 308 is increased. If SOC 306 increases for a period of time due to injected power is more than the power needed for preconditioning, charging power 308 is decreased. SOC 306 is kept relatively stable at a level between threshold SOC 306-*t* and 100%. At time point 314, charging power 308 returns to first charging power 308-1 to fully charge battery 107. At departure time 316, the SOC is at or approximately at 100%. Because of the automatic management, a manual plug-in to initiate or reinitiate a charging session is obviated.

In the example embodiment, charging curves 302 may be adjusted based on departure time 316. Charging management computing device 102 may receive departure time 316. Departure time 316 may be user defined. Based on departure time 316, charging management computing device 102 is configured to determine parameters of the charging session such as time point 314 when charging power 308 returns to first charging power 308-1. Charging management computing device may also determine first charging power 308-1 and/or second charging power 308-2 based on departure time 316. For example, if departure time 316 is relatively soon, first charging power 308-1 may be the maximum charging power allowed by charging point 104 and electric vehicle 106, and/or a relatively higher second charging power 308-1 but shorter second section 304-2 may be implemented.

Systems and methods described herein are advantageous in ensuring the SOC of battery 107 in electric vehicle 106, especially commercial electric vehicle 106, to be fully charged at departure time 316, where start-up and/or preconditioning may consume a relatively large portion of power in battery 107, thereby increasing the range of electric vehicle 106 after a charging session and reducing the frequency in need of charging.

Systems and methods described herein are advantageous in managing of a charging session by including an automatic control of the charging session based on the SOC and the power consumption of the electric vehicle before departure, thereby increasing convenience and reliability, compared to known methods.

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

Figure 4:
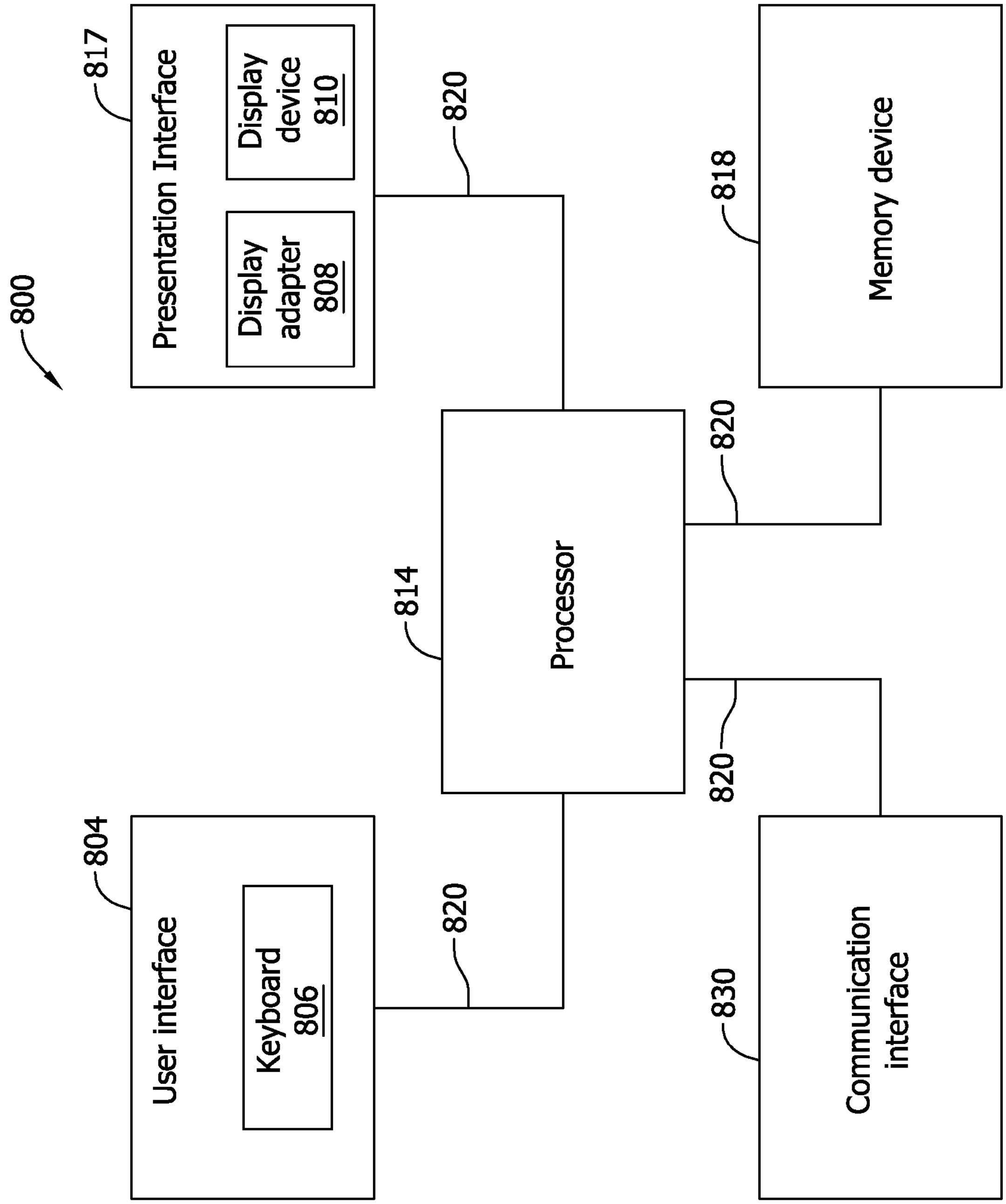
FIG. 4 is a block diagram of an example computing device.

Charging management computing device 102 described herein may be any suitable computing device 800 and software implemented therein. FIG. 4 is a block diagram of an example computing device 800. In the example embodiment, computing device 800 includes a user interface 804 that receives at least one input from a user. User interface 804 may include a keyboard 806 that enables the user to input pertinent information. User interface 804 may also include, for example, a pointing device, a mouse, a stylus, a touch sensitive panel (e.g., a touch pad and a touch screen), a gyroscope, an accelerometer, a position detector, and/or an audio input interface (e.g., including a microphone).

Moreover, in the example embodiment, computing device 800 includes a presentation interface 817 that presents information, such as input events and/or validation results, to the user. Presentation interface 817 may also include a display adapter 808 that is coupled to at least one display device 810. More specifically, in the example embodiment, display device 810 may be a visual display device, such as a cathode ray tube (CRT), a liquid crystal display (LCD), a light-emitting diode (LED) display, and/or an "electronic ink" display. Alternatively, presentation interface 817 may include an audio output device (e.g., an audio adapter and/or a speaker) and/or a printer.

Computing device 800 also includes a processor 814 and a memory device 818. Processor 814 is coupled to user interface 804, presentation interface 817, and memory device 818 via a system bus 820. In the example embodiment, processor 814 communicates with the user, such as by prompting the user via presentation interface 817 and/or by receiving user inputs via user interface 804. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition and/or meaning of the term "processor."

In the example embodiment, memory device 818 includes one or more devices that enable information, such as executable instructions and/or other data, to be stored and retrieved. Moreover, memory device 818 includes one or more computer readable media, such as, without limitation, dynamic random access memory (DRAM), static random access memory (SRAM), a solid state disk, and/or a hard disk. In the example embodiment, memory device 818 stores, without limitation, application source code, application object code, configuration data, additional input events, application states, assertion statements, validation results, and/or any other type of data. Computing device 800, in the example embodiment, may also include a communication interface 830 that is coupled to processor 814 via system bus 820. Moreover, communication interface 830 is communicatively coupled to data acquisition devices.

In the example embodiment, processor 814 may be programmed by encoding an operation using one or more executable instructions and providing the executable instructions in memory device 818. In the example embodiment, processor 814 is programmed to select a plurality of measurements that are received from data acquisition devices.

In operation, a computer executes computer-executable instructions embodied in one or more computer-executable components stored on one or more computer-readable media to implement aspects of the invention described and/or illustrated herein. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Figure 5:
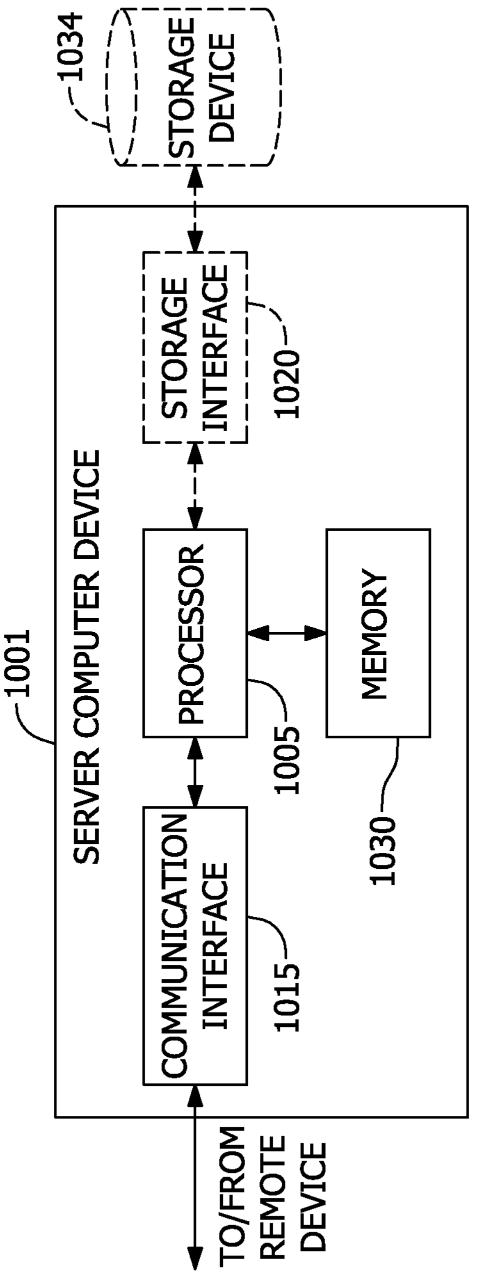
FIG. 5 is a block diagram of an example server computing device.

FIG. 5 illustrates an example configuration of a server computer device 1001 such as charging management computing device 102. Server computer device 1001 also includes a processor 1005 for executing instructions. Instructions may be stored in a memory area 1030, for example. Processor 1005 may include one or more processing units (e.g., in a multi-core configuration).

Processor 1005 is operatively coupled to a communication interface 1015 such that server computer device 1001 is capable of communicating with a remote device or another server computer device 1001. For example, communication interface 1015 may receive data from charging management computing device 102 or a charging point 104, via the Internet.

Processor 1005 may also be operatively coupled to a storage device 1034. Storage device 1034 is any computer-operated hardware suitable for storing and/or retrieving data. In some embodiments, storage device 1034 is integrated in server computer device 1001. For example, server computer device 1001 may include one or more hard disk drives as storage device 1034. In other embodiments, storage device 1034 is external to server computer device 1001 and may be accessed by a plurality of server computer devices 1001. For example, storage device 1034 may include multiple storage units such as hard disks and/or solid state disks in a redundant array of independent disks (RAID) configuration. storage device 1034 may include a storage area network (SAN) and/or a network attached storage (NAS) system.

In some embodiments, processor 1005 is operatively coupled to storage device 1034 via a storage interface 1020. Storage interface 1020 is any component capable of providing processor 1005 with access to storage device 1034. Storage interface 1020 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1005 with access to storage device 1034.

At least one technical effect of the systems and methods described herein includes (a) ensuring the battery of an electric vehicle fully charged when the electric vehicle consumes power during charging; (b) automatic control of a charging session to adjust the charging power based on the power consumption.

Example embodiments of systems and methods of managing charging of electric vehicles are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A charging management computing device for managing charging of an electric vehicle at a charging point, the charging management computing device comprising at least one processor in communication with at least one memory device, and the at least one processor programmed to:

instruct a charging point to charge an electric vehicle at a first charging power until a state of charge (SOC) of the electric vehicle reaches a threshold SOC, the threshold SOC being less than 100%;

reduce a charging power delivered to the electric vehicle from the first charging power to a second charging power;

monitor the SOC of the electric vehicle; and maintain the SOC to be below 100% until a time point before a departure time of the electric vehicle from the charging point by adjusting the charging power based on the SOC to dynamically match a power draw of preconditioning of the electric vehicle without discharging the battery, wherein adjusting the charging power based on the SOC comprises: reducing the charging power if the SOC increases for a first period of time; and increasing the charging power if the SOC decreases for a second period of time.

2. The charging management computing device of claim 1, wherein the at least one processor is further programmed to: increase the charging power to the first charging power at the time point.

3. The charging management computing device of claim 1, wherein the at least one processor is further programmed to: communicate instructions to the charging point at a frequency faster than a communication frequency between the electric vehicle and the charging point.

4. The charging management computing device of claim 1, wherein the at least one processor is further programmed to: receive the departure time; and determine parameters of a charging session of the electric vehicle.

5. The charging management computing device of claim 1, wherein the threshold SOC is 97%.

6. The charging management computing device of claim 1, wherein the at least one processor is further programmed to: receive the threshold SOC from a user.

7. A method of managing charging of an electric vehicle at a charging point, the method comprising:

instructing a charging point to charge an electric vehicle at a first charging power until a state of charge (SOC) of the electric vehicle reaches a threshold SOC, the threshold SOC being less than 100%;

reducing a charging power delivered to the electric vehicle from the first charging power to a second charging power;

monitoring the SOC of the electric vehicle; and maintaining the SOC to be below 100% until a time point before a departure time of the electric vehicle by adjusting the charging power based on the SOC to dynamically match a power draw of preconditioning of the electric vehicle without discharging the battery, wherein adjusting the charging power based on the SOC comprises: reducing the charging power if the SOC increases for a first period of time; and increasing the charging power if the SOC decreases for a second period of time.

8. The method of claim 7, further comprising: increasing the charging power to the first charging power at the time point.

9. The method of claim 7, further comprising: communicating instructions to the charging point at a frequency faster than a communication frequency between the electric vehicle and the charging point.

10. The method of claim 7, further comprising: receiving a departure time from a user; and determining parameters of a charging session of the electric vehicle.

11. The method of claim 7, wherein the threshold SOC is 97%.

12. The method of claim 7, further comprising: receiving the threshold SOC from a user.

13. One or more non-transitory machine-readable storage media for managing charging of an electric vehicle at a charging point, comprising a plurality of instructions stored thereon that, in response to being executed, cause a system to:

instruct a charging point to charge an electric vehicle at a first charging power until a state of charge (SOC) of the electric vehicle reaches a threshold SOC, the threshold SOC being less than 100%;

reduce a charging power delivered to the electric vehicle from the first charging power to a second charging power;

monitor the SOC of the electric vehicle; and maintain the SOC to be below 100% until a time point before a departure time of the electric vehicle from the charging point by adjusting the charging power based on the SOC to dynamically match a power draw of preconditioning of the electric vehicle without discharging the battery, wherein adjusting the charging power based on the SOC comprises: reducing the charging power if the SOC increases for a first period of time; and increasing the charging power if the SOC decreases for a second period of time.

14. The one or more non-transitory machine-readable storage media of claim 13, wherein the plurality of instructions further cause the system to: increase the charging power to the first charging power at the time point.

15. The one or more non-transitory machine-readable storage media of claim 13, wherein the plurality of instructions further cause the system to: communicate instructions to the charging point at a frequency faster than a communication frequency between the electric vehicle and the charging point.

16. The one or more non-transitory machine-readable storage media of claim 13, wherein the plurality of instructions further cause the system to: receive a departure time; and determine parameters of a charging session of the electric vehicle.

17. The one or more non-transitory machine-readable storage media of claim 13, wherein the plurality of instructions further cause the system to: receive the threshold SOC from a user.

* * * * *